UNITED STATES PATENT OFFICE.

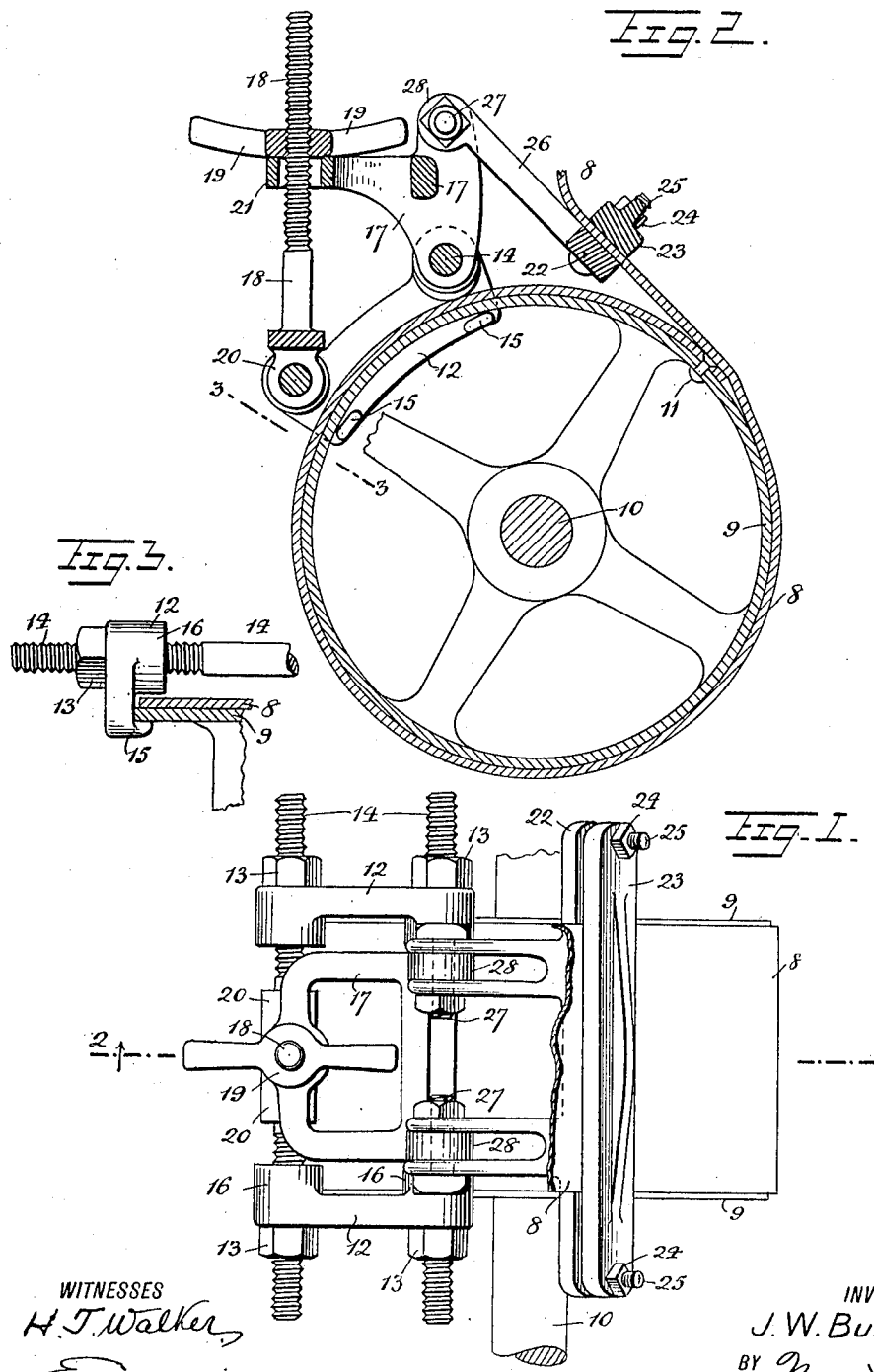

JACOB WIENS BULLER, OF HILLSBORO, KANSAS, ASSIGNOR TO BULLER COUPLER COMPANY, INC., OF HILLSBORO, KANSAS, A CORPORATION OF WISCONSIN.

LAGGING-STRETCHER.

1,298,452.  Specification of Letters Patent.  Patented Mar. 25, 1919.

Application filed November 5, 1918. Serial No. 261,263.

*To all whom it may concern:*

Be it known that I, JACOB W. BULLER, a citizen of the United States, and a resident of Hillsboro, in the county of Marion and State of Kansas, have invented a new and Improved Lagging-Stretcher, of which the following is a full, clear, and exact description.

Among the principal objects which the present invention has in view are: to facilitate the installation of a facing lagging on pulleys or similar mechanical elements; to permit the operation of facing or covering a pulley without removing the same from service; and to provide a portable apparatus for accomplishing the above-stated objects.

Drawings.

Figure 1 is a top plan view of an apparatus of the character mentioned, shown as in conjunction with and in the act of stretching a facing lagging thereon;

Fig. 2 is a vertical section of the same, the section being taken as on the line 2—2 in Fig. 1;

Fig. 3 is a detail view showing a fragment of the pulley, lagging thereon, a binding screw and nut with one of the spreading jaws with which the apparatus is provided.

Description.

The apparatus herein disclosed is particularly designed for stretching a pliable facing or lagging such as indicated in the drawings by the numeral 8, on the face of a pulley, such as indicated by the numeral 9. Usually such an operation is performed in a shop, the pulley being removed from its shaft 10 to accommodate this.

One end of the facing or lagging is permanently secured to the pulley 9, by a series of rivets 11. The free end of the lagging is drawn tightly around the face of the pulley and while so drawn or stretched, is riveted or otherwise immovably secured to the face or felly of the pulley. The surplus of the lagging is cut so that the ends abut and avoid a gap in the face of the pulley.

When provided with an apparatus as herein disclosed, it becomes necessary to remove the pulley from the shaft for the reason that the jaws 12 may be relatively spread by manipulating the nuts 13 on the threaded sections of the screws 14, so that the hooks 15 of the said jaws may pass the edges of the pulley face. When the jaws 12 are thus arranged and the lagging 8 has been secured by the rivets 11, the apparatus is adjusted to the pulley and secured to the end of the lagging by lowering the said jaws until the bosses 16 thereof rest on the lagging 8, the hooks then extending below the overhanging edge of the pulley face. The nuts 13 are then manipulated to draw the jaws toward one another until the hooks 15 are held within the face of the pulley 9.

Pivotally connected with one of the screws 14, is a rocking frame 17. The frame 17 is rocked by means of a screw 18, the threaded extension of which is engaged by a wing nut 19. The screw 18 is pivotally connected with the screw 14, uniting the opposite ends of the jaws 12 by means of a link coupling 20. As shown best in Fig. 2 of the drawings, the screw 18 extends through a perforation in the bracket 21 with which the frame 17 is provided.

The free end of the lagging 8 is engaged by the present apparatus, and between the fixed jaw 22 and the separable jaw 23 thereof. The jaws 22 and 23 constitute clamping means which are drawn together while manipulating the nuts 24 on the screws 25. The jaw 22 is integrally connected with and forms part of the swinging frame embodying the arms 26. The arms 26 are pivotally mounted on bolts 27, which are mounted in the lugs 28 extended from the frame 17 at the sides thereof.

When furnished with an apparatus constructed and arranged as shown in the accompanying drawings, and as described herein, the operation of facing or stretching the lagging on a pulley is simplified, as it consists in mounting the apparatus in operative relation to the pulley and lagging as above set forth, after the end of the lagging 8 has been first secured to the pulley 9 by the rivets 11. The jaws 12 having been moved to engage the face of the pulley 9, the apparatus is moved until the free end of the lagging may be extended between the jaws 22 and 23, the nuts 24 having been manipulated to open the said jaws. The free end of the lagging having been inserted between the said jaws, the nuts 24 are operated to clamp the jaws firmly upon the said free end of the lagging, the nut 19 having been previously retracted, so that the frame 17 may be rocked backward to extend the jaws 22 and 23 beyond the said free end of the lagging.

When these adjustments have been made, the operator turns down the nut 19, with the result that the frame 17 is rocked to draw the lugs 28 forward, carrying therewith the jaws 22 and 23, and the free end of the lagging 8 held thereby. It is obvious that the power applied by means of the nut 19, is greatly magnified by the pitch of the thread of the screw 18, and by the increased leverage afforded by the extension of the bracket 21 in relation to the extension of the lugs 28 relative to the pivot formed by the screw 14 on which the frame 17 is mounted.

The result of the operation is that the lagging 8 is stretched over the pulley 9, to be secured thereto and trimmed thereon.

*Claim.*

A lagging stretcher comprising a plurality of clamping plates adapted for engaging opposite overhanging edges of a cylindrical body; a plurality of contracting bolts engaging said plates for drawing the same into engagement with said body; a rocking lever pivotally mounted on one of said bolts, said lever having a bracket extending toward the other of said bolts; a feed nut and screw pivotally mounted on said other bolt and operatively engaging said bracket for rocking said lever; and a clamping jaw pivotally connected with said lever at a point removed from the fulcrum thereof, the free end of said jaw being adapted to hold the free end of the lagging.

JACOB WIENS BULLER.

Copies of this patent may be obtained for five cents each, by addressing the "Commissioner of Patents, Washington, D. C."